US008881186B2

(12) United States Patent
Kalaboukis

(10) Patent No.: US 8,881,186 B2
(45) Date of Patent: Nov. 4, 2014

(54) METHOD AND SYSTEM FOR IMPROVED MEDIA DISTRIBUTION

(75) Inventor: Chris Kalaboukis, Los Gatos, CA (US)

(73) Assignee: Yahoo! Inc., Sunnyvale, CA (US)

( * ) Notice: Subject to any disclaimer, the term of this patent is extended or adjusted under 35 U.S.C. 154(b) by 765 days.

(21) Appl. No.: 11/777,187

(22) Filed: Jul. 12, 2007

(65) Prior Publication Data

US 2009/0019486 A1      Jan. 15, 2009

(51) Int. Cl.
*H04N 7/16*        (2011.01)
*H04N 7/173*       (2011.01)
*H04N 21/2343*     (2011.01)
*H04N 21/2547*     (2011.01)

(52) U.S. Cl.
CPC ....... *H04N 7/173* (2013.01); *H04N 21/234309* (2013.01); *H04N 21/2547* (2013.01)
USPC .............................................. 725/1; 725/86

(58) Field of Classification Search
CPC .................. H04N 21/234309; H04N 21/2547; H04N 7/173
See application file for complete search history.

(56) References Cited

U.S. PATENT DOCUMENTS

| | | | | |
|---|---|---|---|---|
| 5,724,521 | A * | 3/1998 | Dedrick | 705/26 |
| 6,199,054 | B1 * | 3/2001 | Khan et al. | 705/400 |
| 6,820,277 | B1 * | 11/2004 | Eldering et al. | 725/35 |
| 7,069,310 | B1 * | 6/2006 | Bartholomew | 709/219 |
| 7,403,910 | B1 * | 7/2008 | Hastings et al. | 705/26 |
| 2004/0003398 | A1 * | 1/2004 | Donian et al. | 725/34 |
| 2005/0119936 | A1 * | 6/2005 | Buchanan et al. | 705/14 |
| 2005/0229220 | A1 * | 10/2005 | Fisher et al. | 725/89 |
| 2008/0028294 | A1 * | 1/2008 | Sell et al. | 715/234 |
| 2008/0092182 | A1 * | 4/2008 | Conant | 725/109 |
| 2008/0140502 | A1 * | 6/2008 | Birnholz et al. | 705/10 |
| 2009/0210901 | A1 * | 8/2009 | Hawkins et al. | 725/34 |
| 2010/0131983 | A1 * | 5/2010 | Shannon et al. | 725/46 |

OTHER PUBLICATIONS

Cafepress™.COM Shop, sell or create what's on your mind. [online]. CafePress.com, 1999-2007 [retrieved on Oct. 23, 2007] Retrieved from the internet: <http://www.cafepress.com/cp/info/about/.html>.
Netflix Media Center. [online]. Netflix, Inc., 1997-2007 [retrieved on Oct. 17, 2007] Retrieved from the internet: <http://www.netflix.com/MediaCenter?id=5362.html>.

* cited by examiner

*Primary Examiner* — Rong Le
(74) *Attorney, Agent, or Firm* — James J. DeCarlo; Greenberg Traurig, LLP

(57) ABSTRACT

This disclosure describes methods and systems for improved media distribution. More specifically, this disclosure sets forth methods and systems for distributing video to a third party.

16 Claims, 4 Drawing Sheets

METHOD AND SYSTEM FOR IMPROVED MEDIA DISTRIBUTION

BACKGROUND

Increasingly, media content authors are publishing media objects such as video on websites such as YOUTUBE and MYSPACE. In many cases, particularly for amateur and independent media content authors, an arduous and manual process is required for distributing and selling media content to consumers. Media content authors often do not know, or lack the resources to identify, what consumers would be interested in their creations. For example, due in part to an ever-increasing volume of media content made available over the Internet, consumers (i.e., film festival reviewers) are increasingly unable to view all media content that meets certain criteria (i.e., eligibility for a film festival).

SUMMARY

This disclosure describes methods and systems for distributing video clips and other media objects in a seamless way. In one example (which example is intended to be illustrative and not restrictive), the present invention may be considered a method for improved media distribution. The method includes identifying a video clip matching at least one distribution criteria. The method further includes notifying at least one author of the video clip that the video clip may be distributed ia one or more distribution channels to a third party. The method further includes receiving a distribution request from the at least one author, the distribution request identifying a first distribution channel from the one or more distribution channels. The method also includes distributing the video clip via the first distribution channel to the third party.

In one aspect of the method, the first distribution channel comprises a courier service. In another aspect, the method further includes distributing the first distribution channel and, on the basis of distribution, comprises embodying the video clip within a physical medium, and delivering the physical medium to the courier service for delivery to the third party. In another aspect of the method, the first distribution channel is the Internet. In another aspect, the method further includes distributing the video clip via the first distribution channel and, on the basis of distribution, comprises transmitting the video clip via the Internet to the third party. In another aspect of the method, the video clip is streamed via the Internet to the third party. In another aspect of the method, the third party is a consumer. In another aspect, the method includes notifying the at least one author and, on the basis of notification, further comprises notifying the at least one author of at least one fee associated with distributing the video clip via the one or more distribution channels. In another aspect, the method includes receiving compensation from the at least one author for the step of distributing the video clip to the third party. In another aspect, the method further comprises transforming the video clip from a first format into a second format that is substantially different from the first format. In another aspect, the method includes receiving compensation from the at least one author for the step of transforming the video clip. In another aspect of the method, the distribution request identifies a second distribution channel from the one or more distribution channels and, on the basis of identification, further comprises distributing the video clip via the second distribution channel. In another aspect, the method further includes receiving a first level of compensation from the at least one author for the step of distributing the video clip via the first distribution channel. In another aspect, the method further includes receiving a second level of compensation from the at least one author for the step of distributing the video clip via the second distribution channel. In another aspect, the method includes identifying a video clip matching at least one distribution criteria and, on the basis of identification, further comprises identifying a popularity value corresponding to consumption of the video clip by at least one consumer. In another aspect of the method, the popularity value is a number of consumption events by the at least one consumer. In another aspect, the method includes identifying a popularity value and, on the basis of identification, comprises comparing the consumption of the video clip by at least one consumer with the consumption of another video clip. In another aspect, the method includes identifying a video clip matching at least one distribution criteria and, on the basis of identification, further comprises identifying the number of times the video clip was rendered by at least one consumer. In another aspect, the method includes identifying a video clip matching at least one distribution criteria and, on the basis of identification, further comprises identifying the length of the video clip. In another aspect, the method includes identifying a video clip matching at least one distribution criteria and, on the basis of identification, further comprises identifying information corresponding to the at least one author of the video clip.

In another example (which example is intended to be illustrative and not restrictive), the present invention may be considered a system for distributing video. The system includes a video datastore that contains at least one video clip. The system also includes a notification module that notifies a first user associated with the at least one video clip that the at least one video clip may be distributed via at least one distribution channel to a second user. The system still further includes a request module that, in response to notifying the first user about the at least one distribution channel, receives from the first user a request to distribute the at least one video clip via the at least one distribution channel. The system yet further includes a distribution module that distributes the at least one video clip via the at least one distribution channel to the second user.

In one aspect of the system, the distribution module distributes the at least one video clip in response to receiving a request from the second user to distribute the at least one video clip. In another aspect of the system, the at least one distribution channel comprises the Internet. In another aspect of the system, the notification module notifies the first user of at least one fee associated with distributing the at least one video clip. In another aspect of the system, the first user associated with the at least one video clip authored the at least one video clip.

In another example (which example is intended to be illustrative and not restrictive), the present invention may be considered a method for distributing video. The method includes receiving, from at least one author of a video clip, a request to distribute the video clip to at least one consumer, the request identifying at least one distribution channel for distributing the video clip to the at least one consumer. The method also includes distributing, via the at least one distribution channel, the video clip to the at least one consumer.

In one aspect, the method includes receiving, from the at least one consumer, compensation for the step of distributing the video clip. In another aspect, the method includes transferring at least a part of the compensation to the at least one author of the video clip. In another aspect, the method includes receiving, from the at least one author of the video clip, compensation for the step of distributing the video clip In another aspect of the method, distributing the video clip to the at least one consumer includes distribution of digital rights information associated with the video clip. In another aspect of the method, the digital rights information permits the at least one consumer to further distribute the video clip to at least a second consumer. In another aspect, the method includes identifying the at least one distribution channel to the at least one author of the video clip. In another aspect of the method, the at least one distribution channel comprises a courier service. In another aspect, the method includes distributing the video clip via the at least one distribution channel and, on the basis of distribution, further comprises embodying the video clip within a physical medium, and delivering the physical medium to the courier service for delivery to the at least one consumer. In another aspect of the method, the at least one distribution channel is the Internet. In another aspect, the method includes distributing the video clip via the at least one distribution channel and, on the basis of distribution, further comprises transmitting the video clip via the Internet to the at least one consumer. In another aspect of the method, the video clip is streamed via the Internet to the at least one consumer. In another aspect, the method includes receiving a request from the at least one author and, on the basis of reception, further includes notifying the at least one author of at least one fee associated with distributing the video clip via the at least one distribution channel. In another aspect, the method includes receiving compensation from the at least one author for the step of distributing the video clip to the at least one consumer. In another aspect, the method includes transforming the video clip from a first format into a second format that is substantially different from the first format. In another aspect, the method includes receiving compensation from the at least one author for the step of transforming the video clip. In another aspect, the method includes receiving a distribution request identifies at least a second distribution channel and, on the basis of reception, further comprises distributing the video clip via the at least a second distribution channel. In another aspect, the method includes receiving a first level of compensation from the at least one author for the step of distributing the video clip via the at least one distribution channel. In another aspect, the method includes receiving a second level of compensation from the at least one author for the step of distributing the video clip via the at least a second distribution channel.

These and various other features as well as advantages will be apparent from a reading of the following detailed description and a review of the associated drawings. Additional features are set forth in the description which follows, and in part will be apparent from the description, or may be learned by practice of the described embodiments.

It is to be understood that both the foregoing general description and the following detailed description are exemplary and explanatory and are intended to provide further explanation of the invention as claimed.

BRIEF DESCRIPTION OF THE DRAWINGS

The following drawing figures, which form a part of this application, are illustrative of embodiments systems and methods described below and are not meant to limit the scope of the invention in any manner, which scope shall be based on the claims appended hereto.

DETAILED DESCRIPTION

The following detailed description is intended to convey a thorough understanding of the embodiments described by providing a number of specific embodiments and details involving systems and methods for distributing a media object, such as a video clip. It should be appreciated, however, that the claims appended hereto are not limited to these specific embodiments and details, which are exemplary only. It is further understood that one possessing ordinary skill in the art, in light of known systems and methods, would appreciate the applicability of this disclosure for its intended purposes and benefits in any number of alternative embodiments, depending upon specific design and other needs.

Figure 1:
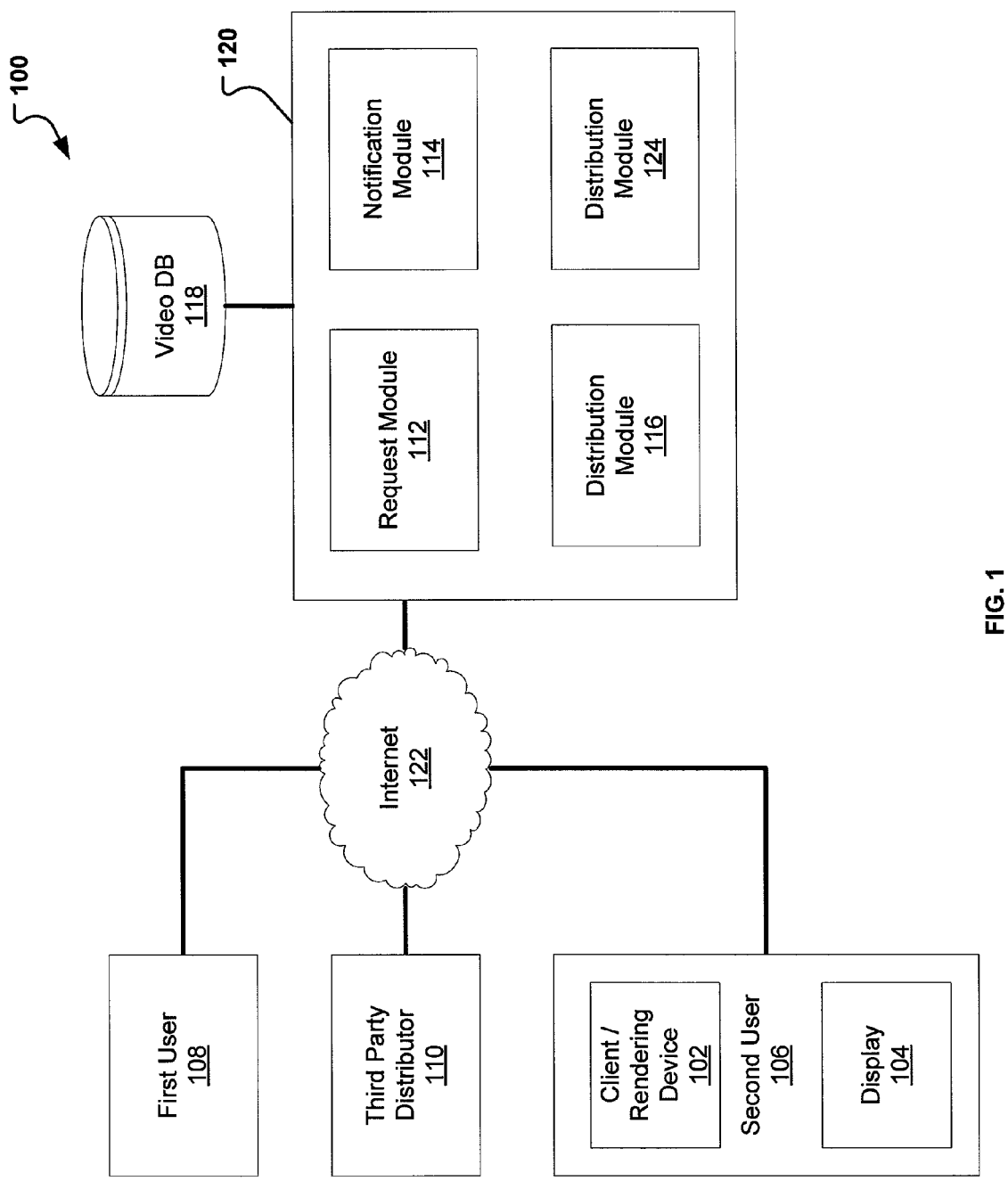
FIG. 1 illustrates an embodiment of a system for distributing video according to some embodiments of the present disclosure.

FIG. 1 illustrates an embodiment of an architecture 100 for distributing at least one video clip. The architecture 100 illustrated is a networked client/server computing architecture in which a rendering device (referred to as a "client") 102 issues media requests to a remote computing device (referred to as a "server") 120 that responds by transmitting the requested media content to the client 102 for rendering to a user 106. The systems and methods described herein are suitable for use with other architectures as will be discussed in greater detail below.

The client 102 is alternatively referred to as a rendering device as, in addition to being able to receive, in some embodiments store, media content transmitted from remote sources, it further is capable of rendering (playing or displaying) such content to its user. Rendering devices may be able to load and play different formats of video including MPEG, DivX, Xvid, AMV and SigmaTel Motion Video (SMV); audio including MP3, WAV, and Ogg Vorbis; digital images, including BMP, JPEG, and GIF; and interactive media, such as flash animations.

To support this rendering capability, the client 102 may be a single purpose device consisting completely or primarily as hardware elements and, possibly, firmware or unchangeable sets of software instructions. Alternatively, and as shown in FIG. 1, a rendering device may also be a computing device capable of obtaining and executing different software applications as needed. For the purposes of this disclosure, a computing device such as the client 102 or server 120 includes a processor and memory for storing and executing data and software. Computing devices may be provided with operating systems that allow the execution of software applications in order to manipulate data. In the embodiment shown, the client 102 is a computing device, such as a personal computer (PC), web-enabled personal data assistant (PDA), a smart phone, a portable media player device such as an IPOD, or a smart TV set top box.

In the embodiment shown, the client 102 is connected to the Internet 122 via a wired data connection or wireless connection such as a wi-fi network, a WiMAX (802.16) network, a satellite network or cellular telephone network. In an alternative embodiment, the client 102 may be connected to the source of the media content via a private network or a direct connection.

In the embodiment shown, the client 102 includes an application (not shown) for rendering media content. Such applications are commonly referred to as media player applications. Examples of such applications include WINDOWS MEDIA PLAYER and YAHOO! MUSIC JUKEBOX. The media player application, when executed, may generate a graphical user interface (GUI) on a display 104 attached to or part of the computing device 102. Alternatively, the GUI may be a web page provided by the server 120 that uses the media player in an "embedded" mode. The GUI includes a set of user-selectable controls through which the user of the client device 102 may control the rendering of the media content. For example, the GUI may include a button control for each of the play-pause-rewind-fast forward commands commonly associated with the rendering of media on rendering devices. By selection of these controls, the user may cause the client 102 to render media content from local storage or from a remote source (e.g., a remote database, storage device or server) and control the rendering of the content to the user.

The architecture 100 includes a server 120, which may be a single server or a group of servers acting together. A number of program modules and data files may be stored in a mass storage device and RAM of the server 120, including an operating system suitable for controlling the operation of a networked server computer, such as the WINDOWS XP or WINDOWS 2003 operating systems from MICROSOFT CORPORATION. The client 102 is connected to the server 120 via a network, such as the Internet 122 as shown.

The server 120 is a media server that serves requests from the client for media content. In an embodiment, the server 120 may be part of a media file sharing system such as YOUTUBE, through which clients 102 may post new media content, view media content posted by others and/or post media content in response to media content posted by others. In the embodiment shown, the system includes a reception module 124 that receives media content, such as a video clip and any related information such as author name, date, time, textual content associated with the video clip, etc., from users and stores the content for later retrieval. In the embodiment shown, the system also includes a notification module 114 that notifies one or more users about media content that matches some distribution criteria and that may be distributed via a distribution channel. For example, criteria may include a video's popularity, length, authorship, etc. where media content comprises a video. In the embodiment shown, the system further includes a request module 112 whereby a user (e.g., a user notified by notification module 114) may request that media content be distributed via one or more distribution channels. In the embodiment shown, the system also includes a distribution module 116 that interfaces with and distributes the media content via one or more distribution channels.

Such media content may be stored as a discrete media object (e.g., a media file containing renderable media data that conforms to some known data format) that is accessible to the server 120, as a group of associated media objects and records, or in some other manner that facilitates efficient storage and retrieval by the server 120 of all related content. In alternative embodiments, the server 120 may be part of different types of systems, such as communications systems, in which different media content from different sources may be collected, searched and retrieved to be rendered as a group. In the embodiment shown in FIG. 1, media content takes the form of video content, or what is commonly referred to as "video clips." Video clips are segments (typically, but not necessarily, short in length) of video content, which may be stored as discrete media files.

The server 120 is illustrated as being connected to a video database 118. The video database 118 stores various video objects that may be requested by the client 102. Local data structures, including discrete media objects such as media files, may be stored on a mass storage device, such as the video database 118. One or more mass storage devices may be connected to, or be part of, any of the devices described herein including the client 102 or a server 120. The mass storage device includes some form of computer-readable media and provides non-volatile storage of data for later use by one or more computing devices. Although the description of computer-readable media contained herein refers to a mass storage device, such as a hard disk or CD-ROM drive, it should be appreciated by those skilled in the art that computer-readable media may be any available media that can be accessed by a computing device.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and that can be accessed by the computer.

In an embodiment, the notification module 114 notifies a first user 108 associated with at least one video clip that the video clip may be distributed via one or more distribution channels. For example, the first user may include an author of the video clip. As another example, the first user may include a person owning some right (e.g., the copyright) to the video clip. In an embodiment, the notification module 114 identifies the distribution channels available to the first user 108. For example, the notification module 114 may identify distribution channels such as the Internet, a courier service (e.g., UPS, Federal Express or the postal service), etc. that may be utilized to distribute the video clip to recipients such as a second user 106 and/or third party distributor 110. The notification module 114 may identify (e.g., the "SUNDANCE FILM FESTIVAL") or describe (e.g., a "film festival") the recipients to the first user 108. In one aspect, the notification module 114 may identify a fee or other information (e.g., legal disclaimers) that the first user must accept prior to acting upon a distribution request.

In the embodiment, the request module 112 then receives from the first user a request to distribute the at least one video clip via the at least one distribution channel. Receipt of a request from the first user may be received in response to notifying the first user by notification module 114 that a video clip may be distributed via one or more distribution channels. In response to receiving a request, the request module 112 may communicate the request to the distribution module 116 that may then distribute the at least one video clip via the at least one distribution channel. For example, the request from the first user may identify numerous distribution channels. The distribution module 116 may also receive a request from the second user (i.e., recipient of a video clip), requesting or commanding distribution of the video clip to the second user. For example, a first user (i.e., an author) may make the video clip available for distribution amongst at least one distribution channel, and the second user (i.e., a consumer) may request or command the distribution of the video clip. Further to this example, the second user may request or command distribution of the video clip in exchange for providing compensation such as paying a one-time or subscription fee.

FIG. 1 presents one embodiment of a client/server architecture for distributing media objects such as video. Other embodiments are also possible in which some functions or tasks are distributed between multiple modules or provided by remote services. Furthermore, although discussed in terms of video clips, as mentioned above the architecture 100 may equally be adapted to media objects of any type of media content including audio, video and textual. The architecture 100 may further be adapted to generate and stream different types of content in a single, combined video stream so that a viewer issuing a consolidated render request could render all responses regardless of content type for example, audio content being rendered concurrently with text identifying the audio content's author, video content being rendered as described above, and textual content being rendered on the display with a predetermined delay to allow for reading, or with a control allowing the viewer to start and stop the rendering of the stream.

Figure 2:
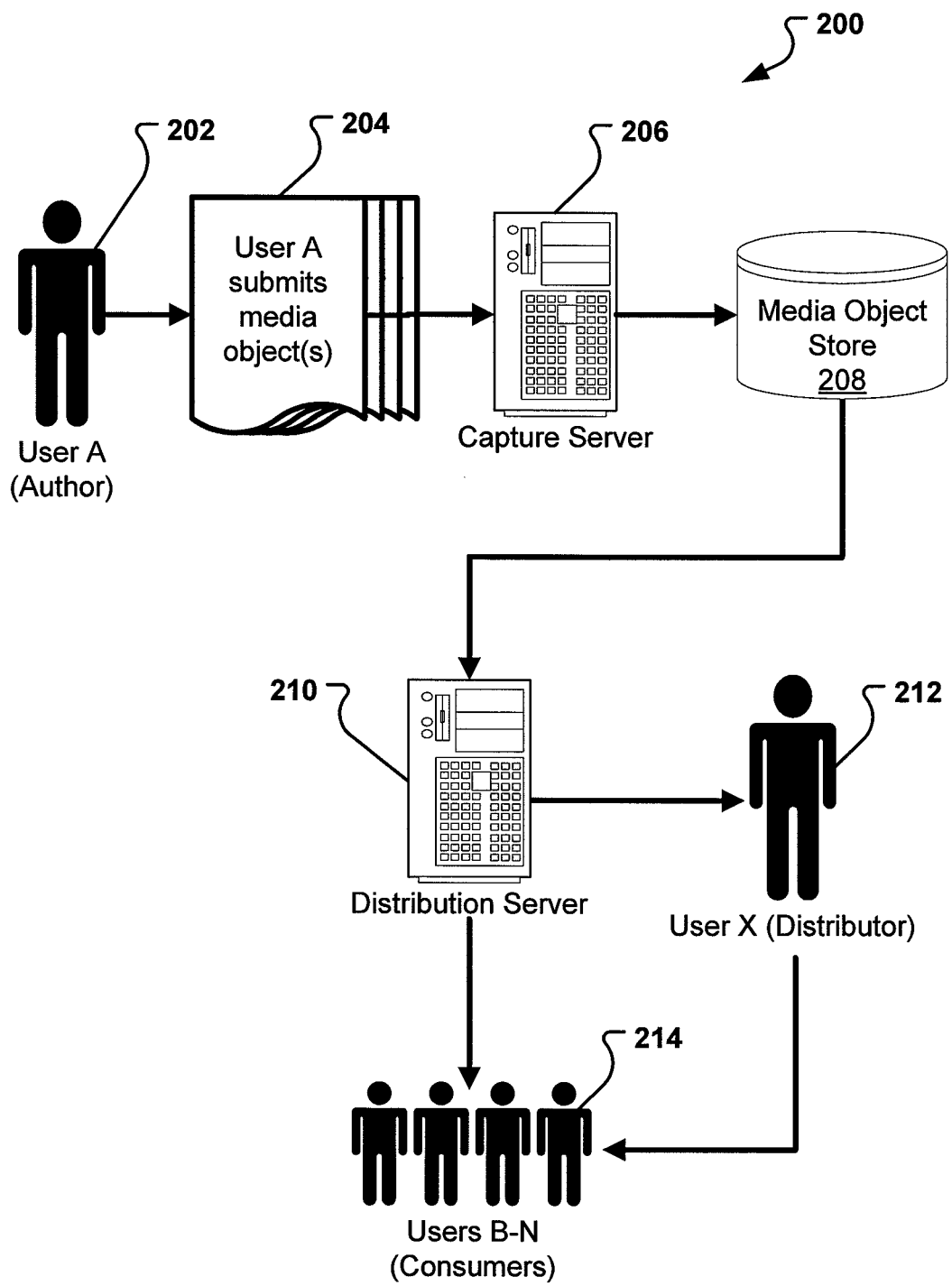
FIG. 2 illustrates an embodiment of a system for distributing video according to some embodiments of the present disclosure.

FIG. 2 illustrates an alternative embodiment of an architecture for distributing video. In the architecture 200 shown, a first user, User A 202, is an author that submits one or more media objects 204, such as video clips or other media content. In an embodiment, the one or more media objects 204 may include any additional associated content such as text, tags, descriptors, author identifying information or other content associated with the one or more media objects 204. Such additional content may be stored independently and/or remotely from the one or more media objects 204.

The one or more media objects 204 are uploaded by User A 202 to a media object capture server 206. The media object capture server 206 then stores the one or more media objects 204 in a media object store 208. In one embodiment, the one or more media objects 204 are then published, i.e., made accessible via a communications network such as the Internet, to consumers, Users B-N, 214 via a media object distribution server 210. The media object distribution server 210 may publish the one or more media objects such that the Users B-N may access the published one or more media objects via the communications network. In another embodiment, the media object distribution server 210 may publish or otherwise transmit the one or more media objects 204 to a distributor, User X, 212. As one example, the distributor 212 may be associated with pay-per-view and/or other subscription services for allowing consumers 214 access (e.g., through a "walled-garden") to the published one or more media objects 204.

Figure 3:
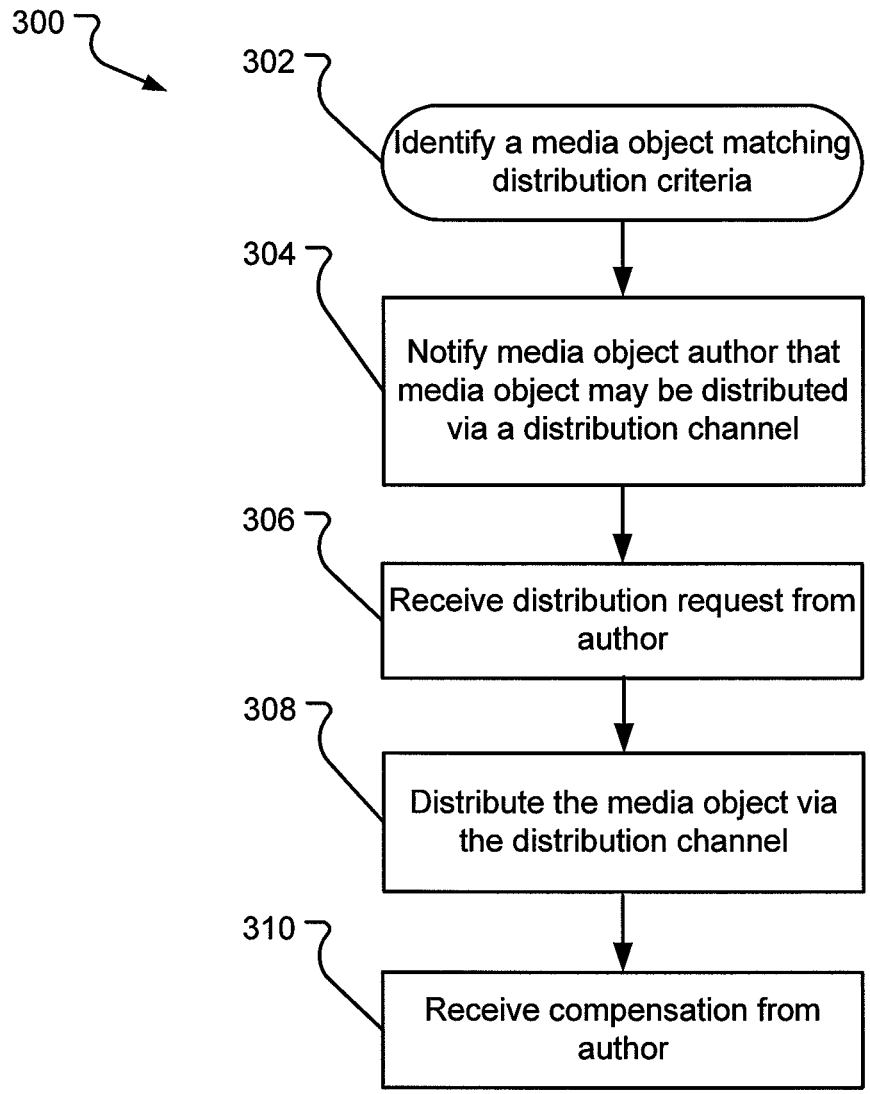
FIG. 3 illustrates an embodiment of a method for improved media distribution according to some embodiments of the present disclosure.

FIG. 3 illustrates an embodiment of a method 300 for improved media distribution. In an identifying operation 302, the method 300 includes identifying a video clip matching at least one distribution criteria. In one embodiment, the identifying operation 302 may involve automatically or manually searching through a repository of video clips or other media content that matches or otherwise corresponds to at least one distribution criteria. Distribution criteria, in the case of video clips and similar media content, may include identification of a popularity value (e.g., the popularity of the video clip to consumers) corresponding to the video clip. For example, a popularity value may correspond to the number of consumers consuming (e.g., editing or playing) the video clip. Distribution criteria may also include comparing a popularity value or other metric of one video clip to the popularity value or related metric of another video clip. In another embodiment, identifying operation 302 may include identifying a video clip that matches or corresponds to the number of times the video clip was rendered (e.g., played or edited) by at least one consumer. In yet another embodiment, identifying operation 302 may involve identifying the length (e.g., playback time) or another property of the video clip itself (e.g., information identifying the author of the video clip).

In a notifying operation 304, one or more authors of a media object such as a video clip are notified that the media object may be distributed via one or more distribution channels to a third party (e.g., an end user, consumer, reseller, etc.). Notification of an author may include directly or indirectly notifying one or more persons by email or some other messaging service. In one embodiment, a distribution channel may comprise a courier service (e.g., the postal service, Federal Express, etc.) and distribution utilizing the courier service may include physically embodying and distributing the video clip in a physical medium (e.g., CD, DVD, etc.). In another embodiment, a distribution channel may comprise a communications network such as the Internet. Distribution utilizing the Internet may include transmitting copies of the media object to one or more users. For example, a video clip may be streamed or downloaded via an Internet distribution channel by one or more users. In one embodiment, notifying operation 304 may include notifying an author of at least one fee associated with distributing the video clip via the one or more distribution channels.

In a receiving request operation 306 of the method 300, an author requests distribution of the video clip via at least one distribution channel. The receiving operation 306 may include receiving an identification of the one or more distribution channels, as well as receiving compensation (e.g., credit card information) for subsequent distribution utilizing a distribution channel.

In a distribution operation 308, the video clip is distributed via at least one distribution channel to a third party. In one embodiment, the method 300 may further include transformation, of the video clip from a first format into a second format that is substantially different from the first format. For example, a video clip originally in a Quicktime (*.MOV) video format may be transformed (e.g., converted and/or reencoded) into a Flash (*.SWF) video format. In a receiving compensation operation 308, compensation may be received (e.g., from an author) for the distribution of the video clip in distribution operation 308. Different levels of compensation may also be received from an author for distributing a video clip via multiple distribution channels.

Figure 4:
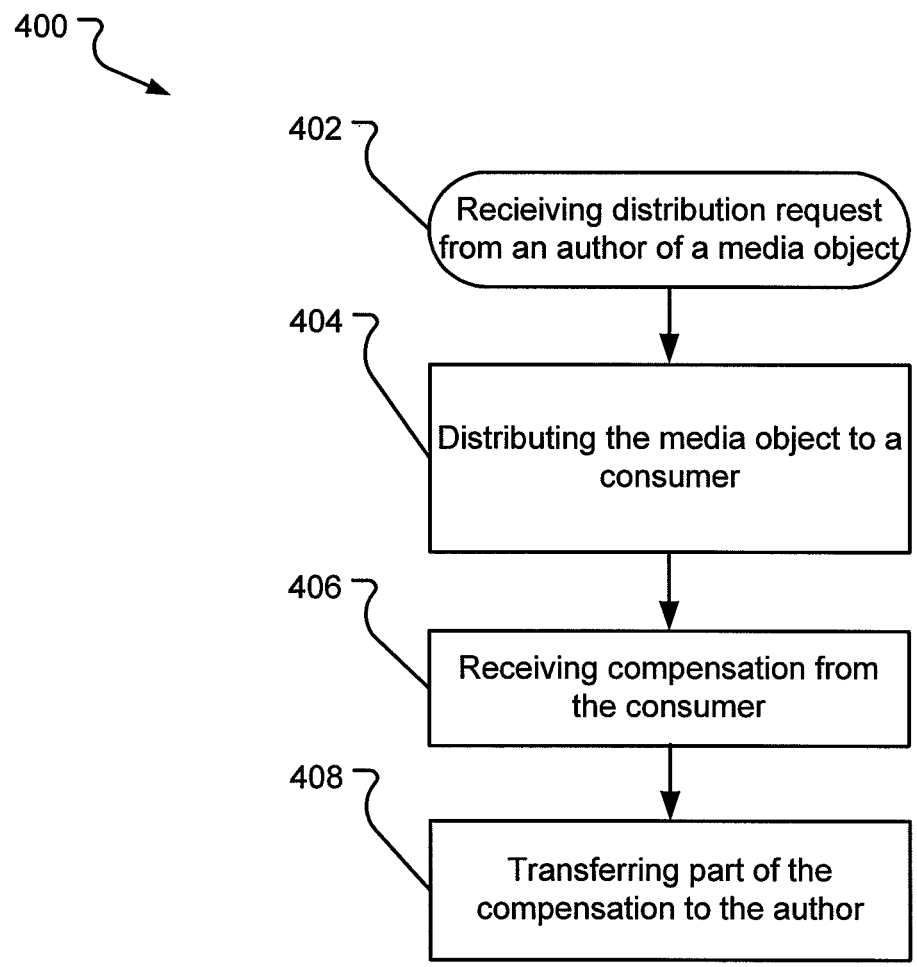
FIG. 4 illustrates an embodiment of a method for distributing video according to some embodiments of the present disclosure.

FIG. 4 illustrates an embodiment of a method 400 for distributing video. In a receiving request operation 402, the method 400 receives a request from one or more authors (i.e., content creators, etc.) that requests distribution of a video clip or other media object to at least one end-user (i.e., consumer). The request identifies at least one distribution channel that may be used for distributing the video clip to the consumer. In a distribution operation 404, the video clip is then distributed to the consumer. In an embodiment, the method 400 also includes receiving compensation from the consumer in a receiving compensation operation 406. In another embodiment, the compensation received from a consumer in receiving compensation operation 406 may be transferred, at least in part, to the one or more authors or other originators of the media content. Similarly, an author of the video clip may also provide compensation for the distribution of the media content via the one or more distribution channels.

In one aspect of distributing operation 404, the video clip may include digital rights information that may permit or restrict transfer or other use of the video clip. For example, a consumer receiving the video clip may be allowed to copy the video clip for another consumer. Likewise, a consumer receiving the video clip may be restricted from certain uses (e.g., inclusion of CGMS-A may prohibit playback on analog video equipment).

In one embodiment, a distribution channel may also comprise a courier service (e.g., the postal service, Federal Express, etc.) and distribution utilizing the courier service may include physically embodying and distributing the video clip in a physical medium (e.g., CD, DVD, etc.). In another embodiment, a distribution channel may comprise a communications network such as the Internet and distribution utilizing the Internet may include transmitting copies of the video clip to one or more users. For example, a video clip could be streamed or downloaded via an Internet distribution channel by one or more users. The receiving request operation 402 may also include receiving an identification of the one or more distribution channels, as well as receiving compensation (e.g., credit card information) for subsequent distribution utilizing a distribution channel.

In a distribution operation 404, the video clip is again distributed via at least one distribution channel to a third party. In one embodiment, the method 400 may further include transformation, of the video clip from a first format into a second format that is substantially different from the first format. Different levels of compensation may also be received from an author for distributing a video clip via multiple distribution channels in distributing operation 404.

Those skilled in the art will recognize that the methods and systems of the present disclosure may be implemented in many manners and as such are not to be limited by the foregoing exemplary embodiments and examples. In other words, functional elements being performed by a single or multiple components, in various combinations of hardware and software or firmware, and individual functions, can be distributed among software applications at either the client or server level or both. In this regard, any number of the features of the different embodiments described herein may be combined into single or multiple embodiments, and alternate embodiments having fewer than or more than all of the features herein described are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, and those variations and modifications that may be made to the hardware or software or firmware components described herein as would be understood by those skilled in the art now and hereafter.

While various embodiments have been described for purposes of this disclosure, various changes and modifications may be made which are well within the scope of this disclosure. For example, the author of a video clip may suggest a price (i.e., to charge a consumer) and preference (i.e., priority) for each type of distribution. As another example, the author may identify or suggest the users (i.e., consumers, end-users, resellers, etc.) that are eligible to receive a video clip or the manner by which users otherwise make use of the video clip.

Numerous other changes may be made which will readily suggest themselves to those skilled in the art and which are encompassed in the spirit of this disclosure and as defined in the appended claims.

What is claimed is:

1. A method comprising:
   identifying, via a computing device, a video clip matching at least one distribution criteria, said matching comprising a determination that qualitative traits for consumers of the video clip and properties associated with the video clip each correspond to the at least one distribution criteria, said at least one distribution criteria comprising a number of renderings for the video clip and a playback length for each rendering, comparing a metric value of each qualitative trait and property with values for related traits of at least one other video clip, and comparing quantitative rendering values respective to the properties of the video clip with corresponding quantitative rendering values of the at least one other video clip;
   notifying at least one author of the video clip that the video clip is to be distributed via one or more distribution channels to a third party;
   receiving, at the computing device, a distribution request from the at least one author, said distribution request identifying a second distribution channel from the one or more distribution channels, wherein a first distribution channel is automatically identified from the one or more distribution channels based at least in part on the at least one distribution criteria and the second distribution channel is identified based on the distribution request;
   distributing the video clip via the first and second distribution channels to the third party;
   receiving a first level of compensation from the at least one author for distributing the video clip via the first distribution channel; and
   receiving a second level of compensation from the at least one author for distributing the video clip via the second distribution channel.

2. The method of claim 1 wherein the first distribution channel comprises a courier service.

3. The method of claim 2 wherein distributing the video clip via the first distribution channel comprises:
   embodying the video clip within a physical medium; and
   delivering the physical medium to the courier service for delivery to the third party.

4. The method of claim 1 wherein the first distribution channel is the Internet.

5. The method of claim 4 wherein distributing the video clip via the first distribution channel comprises:
   transmitting the video clip via the Internet to the third party.

6. The method of claim 5 wherein the video clip is streamed via the Internet to the third party.

7. The method of claim 1 wherein the third party is a consumer.

8. The method of claim 1 wherein the step of notifying the at least one author further comprises:
   notifying the at least one author of at least one fee associated with distributing the video clip via the one or more distribution channels.

9. The method of claim 1 further comprising:
   transforming the video clip from a first format into a second format that is substantially different from the first format.

10. The method of claim 9 further comprising:
    receiving compensation from the at least one author for the step of transforming the video clip.

11. The method of claim 1 wherein the step of identifying a video clip matching at least one distribution criteria comprises:
    identifying a popularity value corresponding to consumption of the video clip by at least one consumer.

12. The method of claim 11 wherein the popularity value is a number of consumption events by the at least one consumer.

13. The method of claim 12 wherein the step of identifying a popularity value comprises:
    comparing the consumption of the video clip by at least one consumer with the consumption of another video clip.

14. The method of claim 1 wherein the step of identifying a video clip matching at least one distribution criteria comprises:
identifying the length of the video clip.

15. The method of claim 1 wherein the step of identifying a video clip matching at least one distribution criteria comprises:
identifying information corresponding to the at least one author of the video clip.

16. A system comprising:
at least one computing device comprising:
memory storing computer-executable instructions; and
one or more processors for executing said computer-executable instructions, comprising:
identifying, via a computing device, a video clip matching at least one distribution criteria, said matching comprising a determination that qualitative traits for consumers of the video clip and properties associated with the video clip each correspond to the at least one distribution criteria, said at least one distribution criteria comprising a number of renderings for the video clip and a playback length for each rendering, comparing a metric value of each qualitative trait and property with values for related traits of at least one other video clip, and comparing quantitative rendering values respective to the properties of the video clip with corresponding quantitative rendering values of the at least one other video clip;
notifying at least one author of the video clip that the video clip is to be distributed via one or more distribution channels to a third party;
receiving, at the computing device, a distribution request from the at least one author, said distribution request identifying a second distribution channel from the one or more distribution channels, wherein a first distribution channel is automatically identified from the one or more distribution channels based at least in part on the at least one distribution criteria and the second distribution channel is identified based on the distribution request;
distributing the video clip via the first and second distribution channels to the third party;
receiving a first level of compensation from the at least one author for distributing the video clip via the first distribution channel; and
receiving a second level of compensation from the at least one author for distributing the video clip via the second distribution channel.

* * * * *